United States Patent [19]
Kitagawa et al.

[11] Patent Number: 5,125,483
[45] Date of Patent: Jun. 30, 1992

[54] MOTOR VEHICLE BRAKE SYSTEM WITH FAIL-SAFE MECHANISM

[75] Inventors: Masashi Kitagawa; Yasuhiko Fujita; Toshiaki Arai, all of Tochigi, Japan

[73] Assignee: Honda Giken Kogyo Kabushiki Kaisha, Tokyo, Japan

[21] Appl. No.: 790,302

[22] Filed: Nov. 12, 1991

[30] Foreign Application Priority Data

Nov. 13, 1990 [JP] Japan .................. 2-306424

[51] Int. Cl.[5] .................. B60T 13/66; B60L 7/00
[52] U.S. Cl. .................. 188/158; 188/1.11;
188/72.1; 188/106 P; 303/20; 303/93
[58] Field of Search .................. 188/72.1, 158, 159,
188/162, 1.11, 156, 106 P, 106 R, 151 A;
303/20, 101, 93, 3, 100, 14-15, 92; 180/197

[56] References Cited

U.S. PATENT DOCUMENTS

| | | | |
|---|---|---|---|
| 4,327,414 | 4/1982 | Kleih | 188/156 X |
| 4,658,939 | 4/1987 | Kircher et al. | |
| 4,854,424 | 8/1989 | Yamatoh et al. | 188/72.1 |
| 4,995,483 | 2/1991 | Moseley et al. | 188/72.1 X |

FOREIGN PATENT DOCUMENTS 60-206766 10/1985 Japan .

Primary Examiner—Douglas C. Butler
Attorney, Agent, or Firm—Armstrong, Nikaido, Marmelstein, Kubovcik & Murray

[57] ABSTRACT

An electric brake system for a motor vehicle has a plurality of braking force generating mechanisms associated with respective road wheels and including electronic actuators mechanically separate from a brake pedal. In the event of a failure of at least one of the braking force generating mechanisms, the electric brake system selects and operates normal braking force generating mechanism or mechanisms for braking the motor vehicle stably with boosted braking forces. The braking force generating mechanisms are mechanically separate from the brake pedal and operable independently of each other. Failure detecting circuits are associated respectively with the braking force generating mechanisms, for detecting a failure of the braking force generating mechanisms and producing a failure signal representing the failure. The electric brake system includes a controller for controlling the braking force generating mechanisms in response to the signal from the brake pedal. The controller selects at least one of the braking force generating mechanisms to be operated based on the failure signal from the failure detecting circuit according to a predetermined rule.

6 Claims, 3 Drawing Sheets

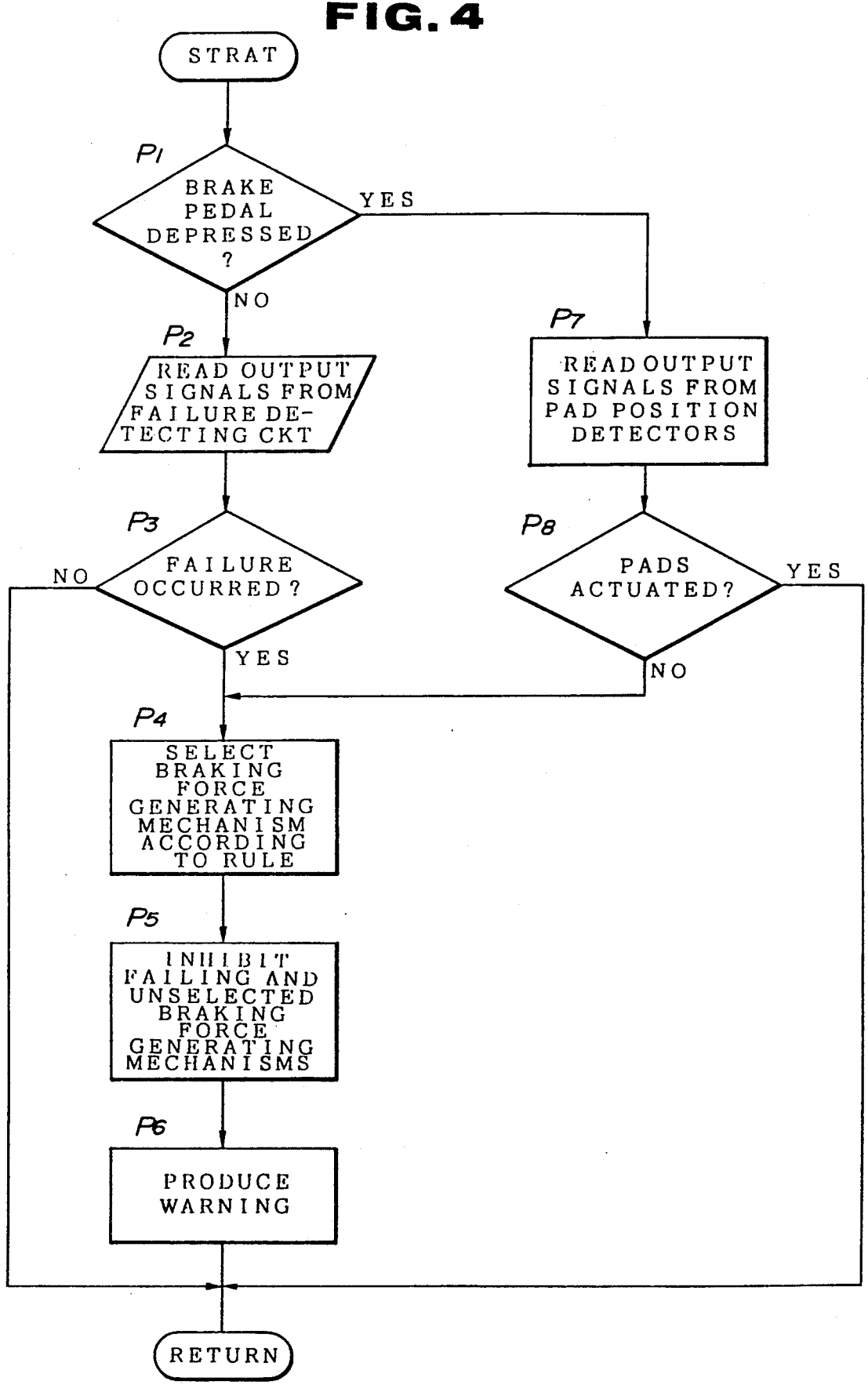

MOTOR VEHICLE BRAKE SYSTEM WITH FAIL-SAFE MECHANISM

BACKGROUND OF THE INVENTION

1. Field of the Invention

The present invention relates to a fail-safe mechanism for an electric brake system for use on motor vehicles, and more particularly to a fail-safe mechanism for an electric brake system including braking force generating mechanisms for applying braking forces to road wheels, the braking force generating mechanism being mechanically separate from a brake pedal and having respective electric actuators that are independently energizable in response to depression of the brake pedal.

2. Description of the Relevant Art

Some motor vehicles incorporate electric brake systems comprising braking force generating mechanisms associated with the respective four road wheels. Such electric brake systems have a sensor for detecting the depression by the driver of the brake pedal. In response to a signal from the sensor, electric actuators of the braking force generating mechanisms are energized to apply boosted braking forces to the road wheels.

One known motor vehicle brake apparatus is disclosed in Japanese Laid-Open Patent Publication No. 60-206766 (corresponding to U.S. Pat. No. 4,658,939), for example. The disclosed motor vehicle brake apparatus includes an electric brake system comprising electric actuators for braking four road wheels of a motor vehicle, and a conventional fluid-pressure brake system for applying braking forces to the front road wheels. In the event of a failure of the electric brake system, the fluid-pressure brake system operates to brake the motor vehicle. When some of the electric actuators fail to operate, the entire electric brake system is put out of operation, and the fluid-pressure brake system is immediately available to brake the motor vehicle.

If the normal electric actuators were able to operate in the event of a failure of other electric actuators, then they would be effective to increase braking forces to be applied to the road wheels and hence to give better controllability to the motor vehicle when it is braked.

SUMMARY OF THE INVENTION

It is an object of the present invention to provide an electric brake system with a fail-safe mechanism for a motor vehicle, which electric brake system has braking force generating mechanisms and a controller that, in the event of a failure of one or more of the braking force generating mechanisms, actuates a selected normal braking force generating mechanism or mechanisms to apply braking forces at a high boosting ratio for braking the motor vehicle stably.

According to the present invention, there is provided a brake system for applying braking forces of road wheels of a motor vehicle, comprising braking command producing means, operable by the driver of the motor vehicle, for producing a braking command to brake the motor vehicle, detecting means for detecting the braking command produced by said braking command producing means and generating a signal representing said braking command, braking force generating means, associated respectively with the road wheels of the motor vehicle, for imparting braking forces to the road wheels, said braking force generating means being mechanically separate from said braking command means and operable independently of each other, failure detecting means, associated respectively with braking force generating means, for detecting a failure of the braking force generating means and producing a failure signal representing the failure, and control means for controlling said braking force generating means in response to the signal from said braking command producing means, said control means including selecting means for selecting at least one of said braking force generating means to be operated based on the failure signal from said failure detecting means according to a predetermined rule.

Depending on the position of the failing braking force generating means, the selecting means selects and operates normal braking force generating means according to the predetermined rule, for thereby imparting braking forces to the motor vehicle. Even in the event of a failure of at least one of the braking force generating means, braking forces are applied at a high boosting ratio to the road wheels to brake the motor vehicle stably.

In the case where the motor vehicle has front and rear road wheels on both sides thereof, when the failure detecting means detects at least one of the braking force generating means, the selecting means selects a normal one of the braking force generating means which is associated with the front road wheel on one or both sides of the motor vehicle.

The above and further objects, details and advantages of the present invention will become apparent from the following detailed description of a preferred embodiment thereof, when read in conjunction with the accompanying drawings.

BRIEF DESCRIPTION OF THE DRAWINGS

FIG. 4 is a flowchart of a control sequence of the electric brake system.

DETAILED DESCRIPTION OF THE PREFERRED EMBODIMENT

Figure 1:
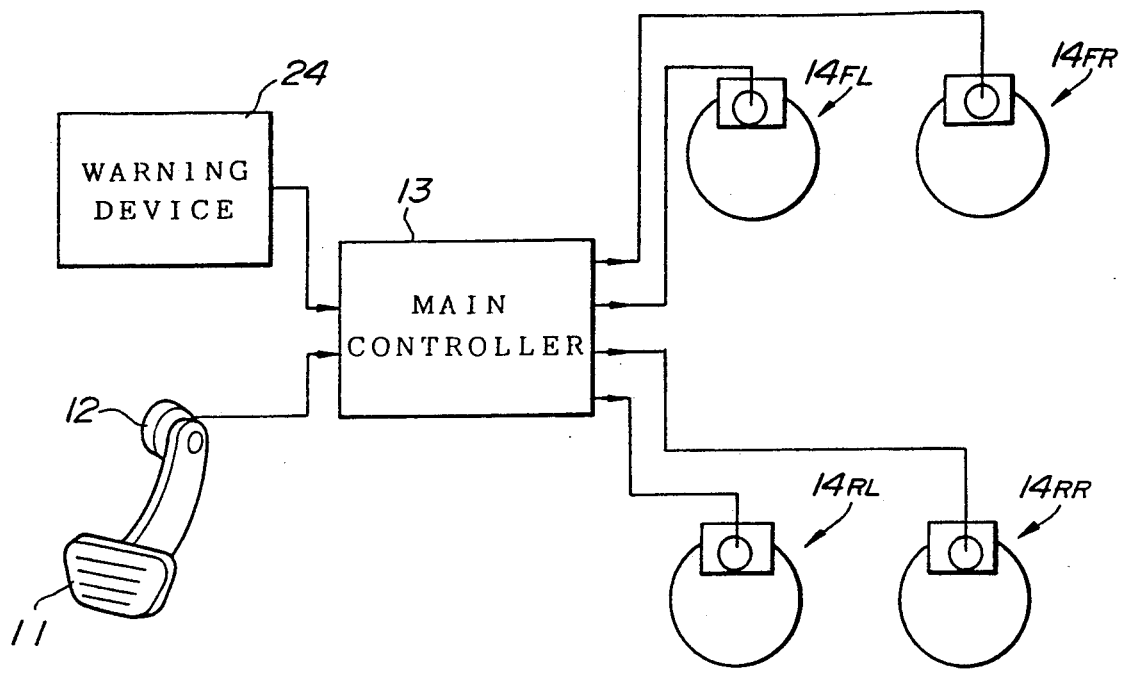
FIG. 1 is a schematic diagram, partly in block form, an electric brake system for a motor vehicle according to the present invention.

FIG. 1 schematically shows an electric brake system according to the present invention, the electric brake system being incorporated in a motor vehicle. The motor vehicle has a brake pedal 11 that is angularly movably supported on a vehicle frame (not shown) of the motor vehicle in front of the driver's seat.

The electric brake system includes a brake detector 12 coupled to the brake pedal 11, for detecting either depressing forces applied to the brake pedal 11 by the driver or a stroke by which the brake pedal 11 is depressed by the driver. The brake detector 12 is electrically connected to a main controller 13, and applies a signal which is indicative of the depressing forces or pedal stroke, to the main controller 13.

The electric brake system also includes four braking force generating mechanisms 14FL, 14FR, 14RL, 14RR associated respectively with front left, front right, rear left, and rear right road wheels of the motor vehicle. The braking force generating mechanisms 14FL, 14FR, 14RL, 14RR are mechanically separate from the brake pedal 11 and operable independently of each other.

Figure 2:
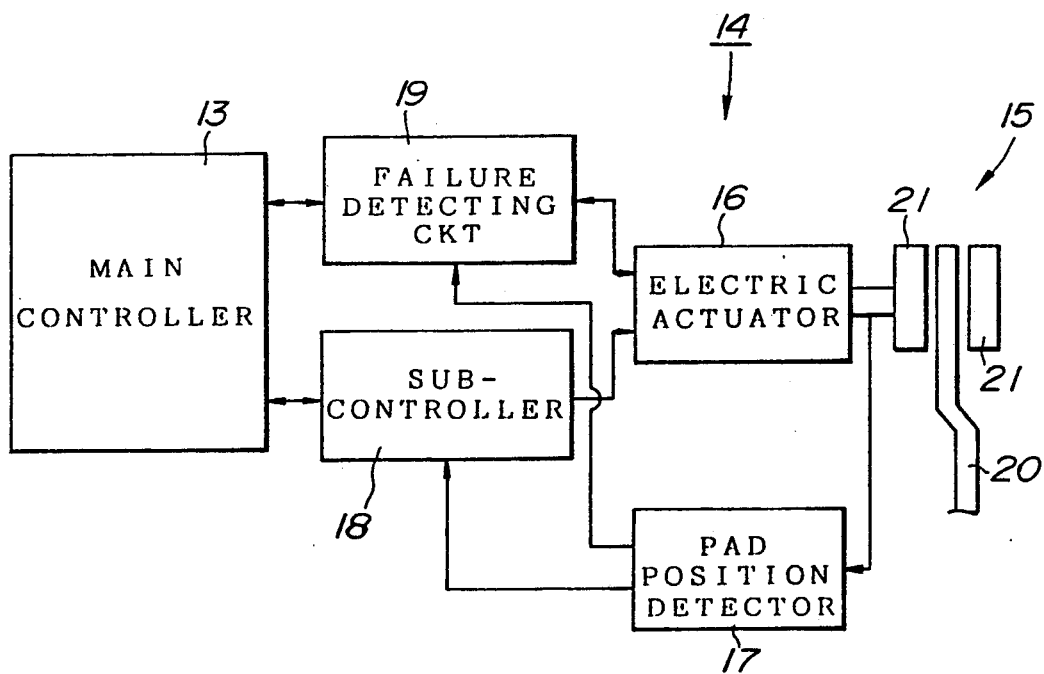
FIG. 2 is a block diagram of a main controller and a braking force generating mechanism of the electric brake system.

Each of the four braking force generating mechanisms 14FL, 14FR, 14RL, 14RR is generally designated by the reference numeral 14 in FIG. 2. In FIG. 2, the braking force generating mechanism 14 comprises a disc brake mechanism 15, an electric actuator 16, a pad position detector 17, a subcontroller 18, and a failure detecting circuit 19. The disc brake mechanism 15 comprises a disc fixed to the road wheel for rotation therewith, and a pair of pads 21 disposed one on each side of the disc 20. The pads 21 are actuatable to grip the disc 20 therebetween to impart braking forces to the road wheel. The electric actuator 16 typically comprises an electric motor 20 electrically connected to the subcontroller 18. In response to a drive signal from the subcontroller 18, the electric motor 16 is energized to actuate a plunger (not shown) through a suitable rotation to linear motion converter (not shown) for pressing the pads 21 against the disc 20.

The pad position detector 17 is electrically connected to the subcontroller 18, and supplies the subcontroller 18 with a signal indicative of the position of the pads 21 with respect to the disc 20. The pad position detector 17 may be arranged to detect the angular displacement of the output shaft of the electric motor 16, or to detect the linear displacement of the plunger coupled between the pads 21 and the output shaft of the electric motor 16, or to count pulses supplied to the electric motor 16 which may comprise a stepping motor.

Figure 3:
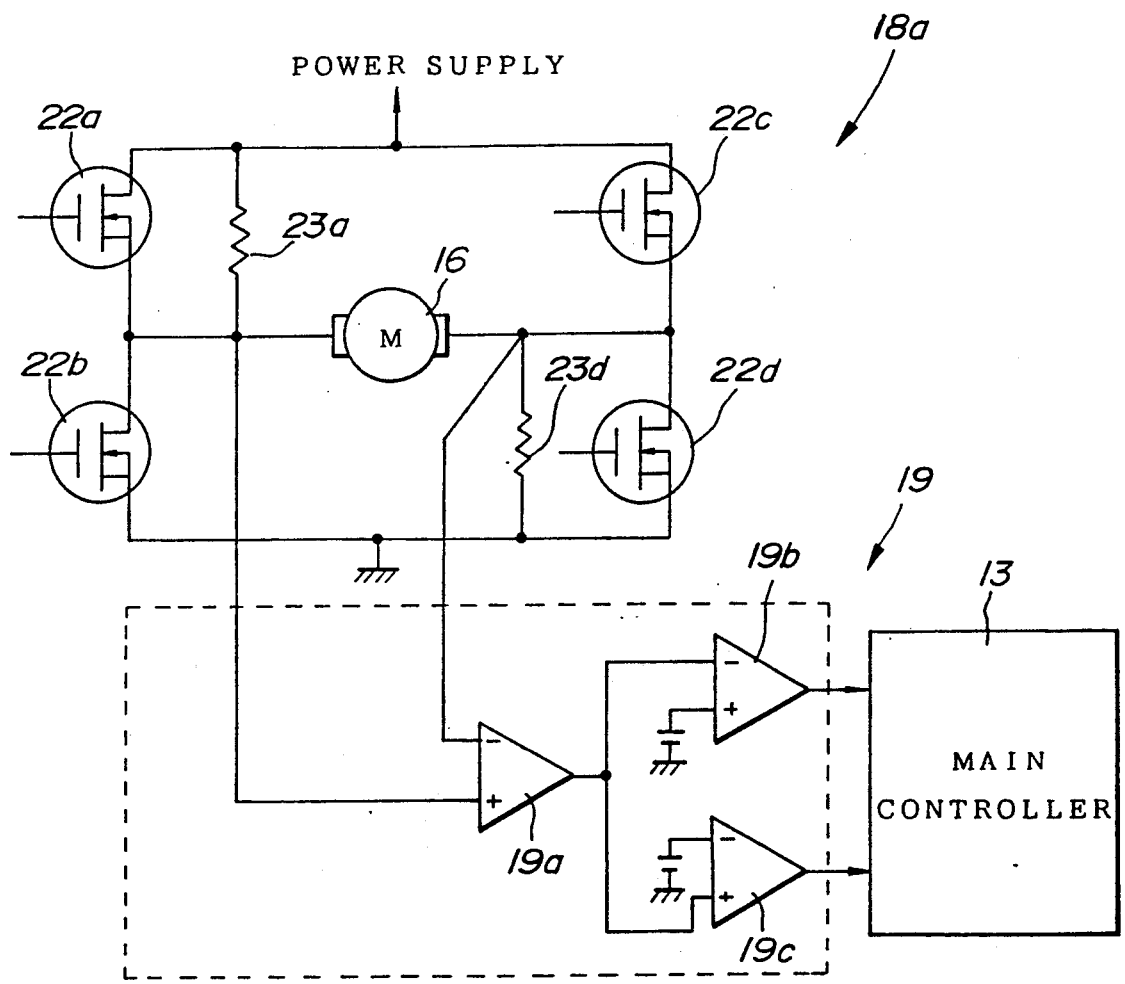
FIG. 3 is a circuit diagram, partly in block form, a driver circuit and a failure detecting circuit of the electric brake system.

The subcontroller 18 comprises a feedback control circuit (not shown) and a driver circuit 18a (see FIG. 3). The feedback control circuit is electrically connected to the main controller 13, and the driver circuit 18a is electrically connected to the electric motor 16. The feedback control circuit is supplied with a control signal from the main controller 13 and a detected signal from the pad position detector 17; and applies drive signals to the driver circuit 18a in response to the supplied signals.

As shown in FIG. 3, the driver circuit 18a comprises four FETs 22a, 22b, 22c, 22d connected in a bridge between a power supply and the ground. The FETs 22a, 22b, 22c, 22d have gates connected to the feedback control circuit. The electric motor 16 is connected between the junction between the source of the FET 22a and the drain of the FET 22b and the junction between the source of the FET 22c and the drain of the FET 22d. The driver circuit 18a also includes a resistor 23a connected across the FET 22a and to one terminal of the electric motor 16 that is connected to the driver circuit 18a, and a resistor 23d connected across the FET 22d and to the other terminal of the electric motor 16 that is connected to the driver circuit 18a. The FETs 22a, 22b, 22c, 22d are turned on and off by drive signals applied to their gates by the feedback control circuit, thereby energizing the electric motor 16. The electric motor 16 is always supplied with a weak current through the resistors 23a, 23d, the weak current being of a value such that the electric motor 16

The failure detecting circuit 19 comprises a differential amplifier 19a and a pair of comparators 19b, 19c. The differential amplifier 19a has two input terminals connected to the respective terminals of the electric motor 16, and an output terminal connected to a negative input terminal of the comparator 19b and a positive input terminal of the comparator 19c. The comparators 19b, 19c have respective output terminals coupled to the main controller 13. The differential amplifier 19a outputs a voltage drop developed across the electric motor 16 by the weak current supplied thereto. The comparators 19b, 19c determine whether the voltage drop falls in a predetermined range. When the voltage drop decreases below a predetermined level due to a shorted failure, such as a short circuit or the like, of the electric motor 16, the comparator 19b applies a failure signal to the main controller 13. When the voltage drop increases above a predetermined level due to an open failure, such as a broken wire or the like, of the electric motor 16, the comparator 19c applies a failure signal to the main controller 13.

The main controller 13 comprises a microcomputer or the like, and is connected to the pedal depression detector 12, the subcontroller 18 of each of the braking force generating mechanisms 14FL, 14FR, 14RL, 14RR, and the failure detecting circuit 19. The main controller 13 is also connected to an warning device 24 (see FIG. 1). The main controller 13 establishes a target braking force based on the output signal from the pedal depression detector 12, and applies a control signal depending on the target braking force to the subcontrollers 18 of the braking force generating mechanisms 14FL, 14FR, 14RL, 14RR. When the main controller 13 is supplied with a failure signal or failure signals from the failure detecting circuit or circuits 19, the main controller 13 selects the braking force generating mechanism or mechanisms 14 that are to be operated, based on the supplied failure signal or signals, energizes only the electric actuator or actuators 16 of the selected braking force generating mechanism or mechanisms 14, and also applies a drive signal or signals to the warning device 24.

The warning device 24 has warning units such as warning lamps, buzzers, or voice generators corresponding to the respective road wheels. In response to the drive signal or signals from the main controller 13, the warning device 24 energizes the corresponding warning unit or units, indicating the malfunctioning braking force generating mechanism or mechanisms 14 to the driver.

Operation of the electric brake system of the above structure will be described below.

When the driver depresses the brake pedal 11, the depression of the brake pedal 11 is detected by the pedal depression detector 12, which then applies an output signal to the main controller 13 In response to the output signal from the pedal depression detector 12, the main controller 13 calculates a target braking force to be generated by the braking force generating mechanisms 14FL, 14FR, 14RL, 14RR and applies a control signal indicative of the calculated braking force to the braking force generating mechanisms 14FL, 14FR, 14RL, 14RR. The braking force generating mechanisms 14FL, 14FR, 14RL, 14RR then generate braking forces at a high boosting ratio according to the control signals.

The main controller 13 of the electric brake system according to the present invention repeatedly executes the control sequence shown in FIG. 4 for determining a failure and taking necessary measures against the determined failure.

First, the main controller 13 determines whether the brake pedal 11 is depressed by the driver based on the output signal from the pedal depression detector 12 in a step P$_2$. If the brake pedal 11 is not depressed, then control goes to a step P$_2$ in which the main controller 13 reads output signals from the failure detecting circuits 19 of the respective braking force generating mechanisms 14FL, 14FR, 14RL, 14RR. The main controller 13 determines whether any of the braking force generating mechanisms 14FL, 14FR, 14RL, 14RR are subjected to a failure in a step $P_3$. If there is a failure detected, then the main controller 13 identifies one or more braking force generating mechanisms that have failed and stores data thereof. The main controller 13 selects, in a step $P_4$, one or more braking force generating mechanisms that are to be actuated, based on the position and number of the braking force generating mechanism or mechanisms that have failed, according to the rule shown by the table below. Stated otherwise, the main controller 13 determines the braking force generating mechanism or mechanisms that should be disabled or inhibited to be actuated. Thereafter, the main controller 13 inhibits the unselected braking force generating mechanism or mechanisms to be actuated in a step $P_5$. The main controller 13 then energizes the warning device 24 to issue a warning in a step $P_6$.

When the warning is produced, the driver may take necessary steps to have the inhibited braking force generating mechanism or mechanisms repaired or replaced.

TABLE

| CASE | BRAKING FORCE GENERATING MECHANISMS | | | | BRAKING FORCE GENERATING MECHANISMS | | | |
|---|---|---|---|---|---|---|---|---|
| | 14FR | 14FL | 14RR | 14RL | 14FR | 14FL | 14RR | 14RL |
| I | NG | G | G | G | OFF | ON | ON | OFF |
| II | G | NG | G | G | ON | OFF | OFF | ON |
| III | G | G | NG | G | ON | ON | OFF | OFF |
| IV | G | G | G | NG | ON | ON | OFF | OFF |
| V | NG | NG | G | G | OFF | OFF | ON | ON |
| VI | G | G | NG | NG | ON | ON | OFF | OFF |
| VII | G | NG | NG | G | ON | OFF | OFF | ON |
| VIII | NG | G | G | NG | OFF | ON | ON | OFF |
| IX | G | NG | G | NG | ON | OFF | OFF | OFF |
| X | NG | G | NG | G | OFF | ON | OFF | OFF |
| XI | G | NG | NG | NG | ON | OFF | OFF | OFF |
| XII | NG | G | NG | NG | OFF | ON | OFF | OFF |
| XIII | NG | NG | G | NG | OFF | OFF | ON | OFF |
| XIV | NG | NG | NG | G | OFF | OFF | OFF | ON |

In the above table, "G" indicates a normal braking force generating mechanism, "NG" a braking force generating mechanism that has failed, "ON" a braking force generating mechanism to be inhibited, and "OFF" a braking force generating mechanism to be actuated.

As can been seen from the above table, in case I and II, only one braking force generating mechanism fails and the remaining three braking force generating mechanisms are normal, but only one front braking force generating mechanism on one side and only one rear braking force generating mechanism on the other side are selected to be actuated. In cases III and IV, both front braking force generating mechanisms are normal and only one rear braking force generating mechanism is normal, but only the front braking force generating mechanisms are selected to be actuated. In cases V through VIII, only two braking force generating mechanisms one on each side are normal, and they are selected to be actuated. In cases IX and X, front and rear brake force generating mechanisms on one side are normal, but only the front braking force generating mechanism is selected to be actuated. In cases XI through XIV, only one braking force generating mechanism is normal with the remaining three braking force generating mechanisms failing, and the single normal braking force generating mechanism is selected to be actuated. The selection of the braking force generating mechanism or mechanisms to be actuated is carried out in the step $P_4$ shown in FIG. 4.

In cases I through VIII, two braking force generating mechanisms one on each side of the motor vehicle are selected to be actuated, thus exerting balanced braking forces to the motor vehicle when it is braked. Therefore, the motor vehicle, when braked, remain stable and controllable well. In cases IX and X, though two front and rear braking force generating mechanisms are normal, since they are only on one side of the motor vehicle, only the normal front braking force generating mechanism is selected to be actuated, with priority over the rear braking force generating mechanism, to brake the motor vehicle more stably and safely than if both front and rear braking force generating mechanisms on one side were selected to be actuated. In cases XI through XIV, only one braking force generating mechanism that is normal is selected to be actuated to brake the motor vehicle safely and effectively.

The electric brake system according to the present invention therefore incorporates a fail-safe mechanism that is brought into action in the event of a failure of one or more braking force generating mechanisms. The fail-safe mechanism makes the motor vehicle more stable and safe when braked than the conventional fluid-pressure front/rear split or diagonal split brake system.

The above table shows a rule to be followed when the motor vehicle runs in the forward direction. When the motor vehicle moves in the reverse direction, a rule to be followed is similar to the rule given by the table except that the front and rear braking force generating mechanisms are switched around.

When the brake pedal 11 is depressed, the electric actuator 16 of each of the braking force generating mechanisms 14FL, 14FR, 14RL, 14RR is controlled under feedback control based on the output signal from the pad position detector 17, as follows:

If the brake pedal 11 is depressed in the step $P_1$, then control goes to a step $P_7$ which reads the output signal from the pad position detector 17 of each of the braking force generating mechanisms 14FL, 14FR, 14RL, 14RR. Thereafter, the main controller 13 determines, in a next step $P_8$, determines whether the pads 21 of each disc brake mechanism 15 have been actuated or not by checking the displacement of the pads 21 with the output signal from the pad position detector 17. If the pads 21 have not been actuated, then the main controller 13 identifies any braking force generating mechanism or mechanisms with inactivated pads and stores data of such braking force generating mechanism or mechanisms, and control goes to the step P4. Thereafter, only a selected braking force generating mechanism or mechanisms are actuated according to the rule given by the above table.

As a consequence, the electric brake system according to the present invention provides a dual safety system that is effective for safe and stable braking capability against brake failures that may occur both when the brake pedal 11 is depressed and when the brake pedal 11 is not depressed. When the operation of any normal braking force generating mechanism is to be inhibited while the vehicle is being braked, the braking force generated by the normal braking force generating mechanism or mechanisms is gradually reduced, rather than instantaneously cut off.

It is also possible to have a vehicle speed sensor installed on the motor vehicle, and operate all the normal braking force generating mechanisms when the vehicle speed as detected by the vehicle speed sensor drops below a reference vehicle speed.

While the electric brake system according to the present invention has been shown and described as being incorporated in a four-wheeled motor vehicle, the principles of the present invention are also applicable to electric brake systems for use on motor vehicles with three, five, or more road wheels.

Although there has been described what is at present considered to be the preferred embodiment of the invention, it will be understood that the invention may be embodied in other specific forms without departing from the essential characteristics thereof. The present embodiment is therefore to be considered in all respects as illustrative, and not restrictive. The scope of the invention is indicated by the appended claims rather than by the foregoing description.

We claim:

1. A brake system for applying braking forces of road wheels of a motor vehicle, comprising:
    braking command Producing means, operable by the driver of the motor vehicle, for producing a braking command to brake the motor vehicle;
    detecting means for detecting the braking command produced by said braking command producing means and generating a signal representing said braking command;
    braking force generating means, associated respectively with the road wheels of the motor vehicle, for imparting braking forces to the road wheels, said braking force generating means being mechanically separate from said braking command means and operable independently of each other;
    failure detecting means, associated respectively with said braking force generating means, for detecting a failure of the braking force generating means and producing a failure signal representing the failure; and
    control means for controlling said braking force generating means in response to the signal from said braking command producing means, said control means including selecting means for selecting at least one of said braking force generating means to be operated based on the failure signal from said failure detecting means according to a predetermined rule.

2. A brake system according to claim 1, wherein the road wheels include front and rear road wheels on both sides of the motor vehicle, said braking force generating means being associated respectively with the front and rear road wheels on both sides of the motor vehicle, said selecting means comprising means for selecting the braking force generating means associated with the front road wheel on one of the sides of the motor vehicle, with priority over the braking force generating means associated with the rear road wheel on said one of the sides, to be operated when said failure detecting means detects a failure of at least one of said braking force generating means.

3. A brake system for applying braking forces of a plurality of road wheels between front and rear ends in a longitudinal direction on both sides of a motor vehicle, comprising:
    braking force generating means, associated respectively with the road wheels of the motor vehicle, for imparting braking forces to the road wheels, said braking force generating means being operable independently of each other;
    failure detecting means, associated respectively with said braking force generating means, for detecting a failure of the braking force generating means and producing a failure signal representing the failure; and
    control means, responsive to the failure signal from said failure detecting means, for disabling any of the braking force generating means that has failed, and also reducing the number of normal ones of the braking force generating means on one of the sides of the motor vehicle, which is opposite to the failing braking force generating means on the other side of the motor vehicle, if the numbers of failing braking force generating means on the both sides of the motor vehicle are different from each other.

4. A brake system according to claim 3, wherein said control means includes means for maintaining the number of normal ones of the braking force generating means on one of the sides of the motor vehicle, which is opposite to the failing braking force generating means on the other side of the motor vehicle, if the numbers of failing braking force generating means on the both sides of the motor vehicle are equal to each other.

5. A brake system according to claim 3, wherein said control means comprises means for disabling at least one of the normal braking force generating means on one of the sides of the motor vehicle, which is opposite to the failing braking force generating means on the other side of the motor vehicle.

6. A brake system according to claim 3, wherein said control means comprises means for disabling the normal braking force generating means closer to the rear end in the longitudinal direction.

* * * * *